(12) United States Patent
Looman et al.

(10) Patent No.: US 11,709,407 B2
(45) Date of Patent: Jul. 25, 2023

(54) IMMOBILIZED BUFFERS IN ELECTROACTIVE DEVICES

(71) Applicant: GENTEX CORPORATION, Zeeland, MI (US)

(72) Inventors: Steven D. Looman, Holland, MI (US); Kelvin L. Baumann, Holland, MI (US); Sue F. Franz, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 416 days.

(21) Appl. No.: 17/173,556

(22) Filed: Feb. 11, 2021

(65) Prior Publication Data

US 2021/0255517 A1    Aug. 19, 2021

Related U.S. Application Data

(60) Provisional application No. 62/976,681, filed on Feb. 14, 2020.

(51) Int. Cl.
*G02F 1/155* (2006.01)
*G02F 1/1516* (2019.01)
*G02F 1/15* (2019.01)

(52) U.S. Cl.
CPC .......... *G02F 1/155* (2013.01); *G02F 1/15165* (2019.01); *G02F 2001/164* (2019.01)

(58) Field of Classification Search
CPC . G02F 1/155; G02F 1/15165; G02F 2001/164
See application file for complete search history.

(56) References Cited

U.S. PATENT DOCUMENTS

| 6,188,505 | B1 | 2/2001 | Lomprey |
| 6,433,914 | B1 | 8/2002 | Lomprey et al. |
| 9,766,528 | B2 | 9/2017 | Kloeppner |
| 9,964,828 | B2 | 5/2018 | Theiste |
| 2018/0321565 | A1* | 11/2018 | Erno .............. G02F 1/1516 |
| 2019/0171077 | A1 | 6/2019 | Kubo et al. |

FOREIGN PATENT DOCUMENTS

KR    101906049 B1    10/2018

OTHER PUBLICATIONS

International Search Report dated Apr. 29, 2021, for corresponding PCT application No. PCT/US2021/017740, 2 pages.
Written Opinion dated Apr. 29, 2021, for corresponding PCT application No. PCT/US2021/017740, 4 pages.

* cited by examiner

*Primary Examiner* — James C. Jones
(74) *Attorney, Agent, or Firm* — Price Heneveld LLP; Brian James Brewer

(57) ABSTRACT

An electro-active device is disclosed that may comprise a buffer immobilized on one or more films. The electro-active device may comprise a first substrate, a second substrate, a first electrode, and a second electrode. The first and second substrates may be disposed in a spaced apart relationship. Further, the first electrode may be associated with the first substrate and the second electrode may be associated with the second substrate. Additionally, a cathodic film may be associated with one electrode and an anodic film may be associated with the other electrode. The anodic film may comprise an anodic compound immobilized thereon and the cathodic film likewise may comprise a cathodic compound immobilized thereon. Further, a buffer component may be immobilized on the cathodic film and/or the anodic film.

20 Claims, 4 Drawing Sheets

Structure (IA)

Structure (IB)

US 11,709,407 B2

IMMOBILIZED BUFFERS IN ELECTROACTIVE DEVICES

CROSS-REFERENCE TO RELATED APPLICATIONS

This application claims priority under 35 U.S.C. § 119(e) to U.S. Provisional Application No. 62/976,681 filed on Feb. 14, 2020, entitled "IMMOBILIZED BUFFERS IN ELECTROACTIVE DEVICES," the disclosure of which is hereby incorporated by reference in its entirety.

FIELD OF INVENTION

The present disclosure is generally related to electroactive devices. More particularly, it is related to the implementation of buffers into electroactive devices.

BACKGROUND OF INVENTION

Electroactive devices have been well known for many years. When a sufficient electrical potential is applied across a pair of electrodes, an electroactive medium, disposed between the electrodes, becomes activated, commonly resulting in a change of its color and/or light transmissivity. Taking advantage of this, devices such as dimmable mirrors and windows have become increasingly popular in industries such as the automotive and aviation industries.

In most automotive and aviation products, the electroactive devices require a continuously applied potential to maintain the device in its activated state. When the potential is removed, the device will return to its original, un-activated state. These devices are commonly referred as self-erasing. They are self-erasing because their electro-active media may undergo de-activation by redox elimination at a given rate via solution phase diffusion. The continuously applied potential serves to activate the electroactive media at a rate substantially equal the de-activation rate. This is particularly problematic for automobiles where energy is limited.

Alternatively, some electro-active devices may maintain their activated states without a continuously applied potential. These devices are commonly referred to as having memory chemistry and rely on preventing anodic and cathodic species of the device's electroactive medium from coming in contact with one another, which would allow for redox self-elimination and thus de-activation.

Additionally, in some devices, buffers are implemented to increase device durability. The buffers increase device durability by absorbing stresses that may be experienced by the electroactive device, combatting the formation of residual activated anodic and cathodic species due to these external stresses. However, the implementation of the buffer may effectively increase the need for electricity. In self-erasing devices, the buffer may facilitate and increase the rate of de-activation. Therefore, the current needed to maintain the overall degree of activation is increased to compensate for the increased rate of de-activation. Further, in the context of "memory chemistry" devices, conventional implementation of the buffer may serve to shuttle electrons between the anodic and cathodic species, thereby enabling a rate of de-activation. Effectively, the implementation of the buffer reduces or eliminates the benefits of the memory chemistry devices. Accordingly, to maintain the desired level of activation in a steady state, a continuously applied potential may again be needed to counter-act the reduced memory functionality. Thus, there is a need for an improved electroactive device that allows for energy saving "memory chemistry" device operation while providing the device durability benefits provided by a buffer.

SUMMARY

In accordance with the present disclosure, the disadvantages and problems associated with implementing buffers into electro-active elements have been substantially reduced or eliminated.

In accordance with one aspect of the present disclosure, a device is disclosed. In some embodiments, the device may be a window. The device may comprise a first substrate, a second substrate, a first electrode, a second electrode, a cathodic film, and an anodic film. The first substrate may comprise first and second surfaces. Likewise, the second substrate may comprise third and fourth surfaces. Further, the second substrate may be disposed in a spaced apart relationship with the first substrate. The first electrode may be associated with the second surface, and the second electrode may, similarly, be associated with the third surface. The cathodic film may be associated with the first electrode. Further, the cathodic film may comprise a cathodic component immobilized thereon. The cathodic component may have a first reduction potential. The anodic film may similarly be associated with the second electrode. Further, the anodic film may comprise an anodic component with a first oxidation potential. Additionally, a cathodic buffer component may be comprised in the cathodic film and/or the anodic buffer component may be comprised in the anodic film. The cathodic buffer component may have first reduction potential less negative than a first reduction potential of the cathodic component. The anodic buffer component may have a first oxidation potential less positive than the first oxidation potential of the anodic component. Further, either the cathodic component or the anodic component may be electrochromic. In some embodiments, the cathodic buffer component may also be comprised in the anodic film. Similarly, in other embodiments, the anodic buffer component may also be comprised in the cathodic film.

In some embodiments, the cathodic film may comprise a first polymeric matrix having a backbone comprise a plurality of monomer units. In such embodiments, the cathodic buffer component may be disposed at one or more locations between monomer units of the backbone. In other such embodiments, the cathodic buffer component may be covalently bonded to the backbone at one or more locations as a functional group. In yet other such embodiments, the cathodic film may further comprise a second polymeric matrix. The second polymeric matrix may be cross-linked with the first polymeric matrix at one or more locations. Further, the second polymeric matrix may have a second backbone comprise a plurality of monomer units. In such an embodiment, the cathodic buffer component may be covalently bonded to the second polymeric matrix. Additionally or alternatively, the cathodic buffer component may be disposed at one or more locations between monomer units of the second backbone.

In other embodiments, the anodic film may comprise a first polymeric matrix having a backbone comprise a plurality of monomer units. In such embodiments, the anodic buffer component may be disposed at one or more locations between monomer units of the backbone. In other such embodiments, the anodic buffer component may be covalently bonded to the backbone at one or more locations as a functional group. In yet other such embodiments, the anodic film may further comprise a second polymeric matrix. The second polymeric matrix may be cross-linked with the first polymeric matrix at one or more locations. Further, the second polymeric matrix may have a second backbone comprise a plurality of monomer units. In such an embodiment, the anodic buffer component may be covalently bonded to the second polymeric matrix. Additionally or alternatively, the anodic buffer component may be disposed at one or more locations between monomer units of the second backbone.

In accordance with another aspect of the present disclosure, a device is likewise disclosed. The device may comprise a first substrate, a second substrate, a first electrode, a second electrode, a cathodic film, an anodic film, a cathodic component, and an anodic component. The first substrate may comprise first and second surfaces. Similarly, the second substrate may comprise third and fourth surfaces. Further, the second substrate may be disposed in a spaced apart relationship with the first substrate. The first electrode may be associated with the second surface, and the second electrode may, similarly, be associated with the third surface. The cathodic film may be associated with the first electrode. The anodic film may likewise be associated with the second electrode. The cathodic component may have a reduction potential and be immobilized on the cathodic film. The anodic component may similarly have an oxidation potential and be immobilized on the anodic film. Additionally, the device may comprise a cathodic buffer and/or an anodic buffer. The cathodic buffer may be immobilized on the cathodic film and have a reduction potential less negative than the reduction potential of the cathodic component. Likewise, the anodic buffer may be immobilized on the anodic film and may have an oxidation potential less positive than the oxidation potential of the anodic component. In some embodiments, at least one of the cathodic and anodic components may be electrochromic.

In some embodiments, the cathodic film may comprise a first polymeric matrix having a backbone comprise a plurality of monomer units. In such embodiments, the cathodic buffer may be associated with the first polymeric matrix via a backbone approach. Additionally or alternatively, in the cathodic buffer may be associated with the first polymeric matrix via a pendant approach.

In other embodiments, the anodic film may comprise a third polymeric matrix having a backbone comprising a plurality of monomer units. In such embodiments, the anodic buffer may be associated with the third polymeric matrix via a backbone approach. Additionally or alternatively, in the anodic buffer may be associated with the third polymeric matrix via a pendant approach.

The advantages of certain aspects of the present disclosure may include enabling an electroactive device having cathodic components, anodic components, cathodic buffer components, and/or anodic buffer components immobilized in films. Accordingly, a non-self-erasing memory device is achieved where the durability advantages of implementing a buffer may be enjoyed while reducing or eliminating the de-activation side effect of the non-immobalized buffer implementation. Further, certain embodiments may have the advantage of enhanced electron transfer between elements of an anodic or cathodic film.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

DETAILED DESCRIPTION

For the purposes of description herein, it is to be understood that the specific devices and processes illustrated in the attached drawings and described in the following specification are simply exemplary embodiments of the inventive concepts defined in the appended claims. Hence, specific dimensions and other physical characteristics relating the embodiments disclosed herein are not to be considered as limiting, unless the claims expressly state otherwise.

Figure 1:
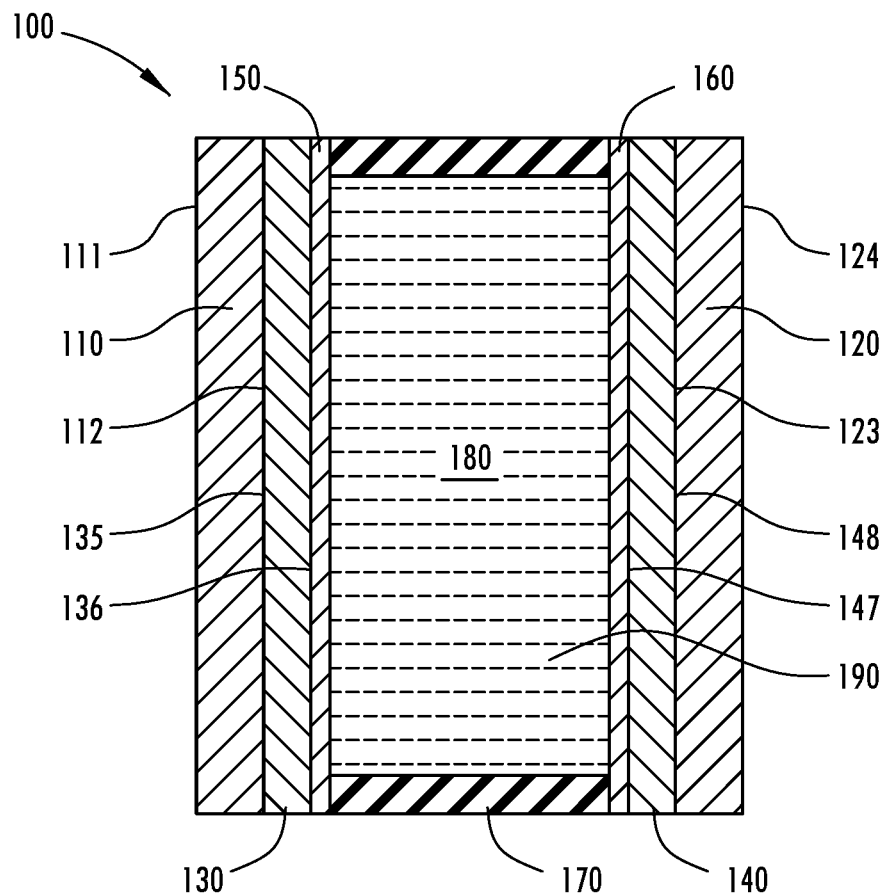
FIG. 1: A schematic representation of an electroactive device.

FIG. 1 is a cross sectional schematic representation of an electroactive device 100.

Electroactive device 100 comprises a first substrate 110, a second substrate 120, a first electrode 130, a second electrode 140, at least one of a cathodic film 150 and an anodic film 160, a seal 170, a chamber 180, and an electrolyte medium 190. Further, electroactive device 100 may be operable between substantially activated and substantially un-activated states. In some embodiments, operation between such states may correspond to variable transmissivity of electroactive device 100. For example, electroactive device 100, may be: a window, such as a sunroof; a battery; a capacitor; a rearview assembly, such as a mirror; or an electro-optic filter.

First substrate 110 may comprise a first surface 111 and a second surface 112. First surface 111 and second surface 112 may be disposed opposite one another with second surface 112 disposed in a first direction relative first surface 110. The first direction may additionally be defined as substantially orthogonal the first and second surfaces 111, 112. In some embodiments, such as for a window, a rearview assembly, or an electro-optic filter, first substrate 110 may be substantially transparent in the visible and/or infrared regions of the electromagnetic spectrum. In other embodiments, such as a battery or a capacitor, substantial transparency may be un-necessary. Accordingly, first substrate 110 may be substantially translucent or opaque. First substrate 110, for example, may be fabricated from any of a number of materials, such as alumino-silicate glass, such as Falcon commercially available from AGC; boroaluminosilicate ("BAS") glass; polycarbonate, such as ProLens® polycarbonate, commercially available from Professional Plastics, which may be hard coated; soda lime glass, such as ultra-clear soda lime glass; float glass; natural and synthetic polymeric resins and plastics, such as polyethylene (e.g., low and/or high density), polyethylene terephthalate (PET), polyethylene naphthalate (PEN), polycarbonate (PC), polysulfone, acrylic polymers (e.g., poly(methyl methacrylate) (PMMA)), polymethacrylates, polyimides, polyamides (e.g., a cycloaliphatic diamine dodecanedioic acid polymer (i.e., Trogamid® CX7323)), epoxies, cyclic olefin polymers (COP) (e.g., Zeonor 1420R), cyclic olefin copolymers (COC) (e.g., Topas 6013S-04 or Mitsui Apel), polymethylpentene, cellulose ester based plastics (e.g., cellulose triacetate), transparent fluoropolymer, polyacrylonitrile; and/or combinations thereof. While particular substrate materials are disclosed, for illustrative purposes only, numerous other substrate materials are likewise suitable—so long as the materials are at least substantially transparent and exhibit appropriate physical properties such as strength and tolerance to conditions of the device's environment, such as ultra-violet light exposure from the sun, humidity, and temperature extremes.

Similarly, second substrate 120 may comprises a third surface 123 and a fourth surface 124. Third surface 123 and fourth surface 124 may be disposed opposite one another with fourth surface 124 disposed in the first direction relative third surface 123. Further, second substrate 120 may be disposed in the first direction in a spaced apart relationship relative first substrate 110. Thus, third surface 123 may face second surface 112. Additionally, second substrate 120 may be fabricated from similar or different materials as that of first substrate 110. Accordingly, in some embodiments, second substrate 120 may be substantially transparent in the visible and/or infrared regions of the electromagnetic spectrum. In other embodiments, second substrate may be substantially translucent or opaque.

First electrode 130 is an electrically conductive material and comprises a fifth surface 135 and a sixth surface 136. Further, fifth surface 135 may be associated with second surface 112. Thus, fifth surface 135 may be disposed on second surface 112. The electrically conductive material of first electrode 130 may be substantially transparent in the visible region of the electromagnetic spectrum, bond reasonably well to first substrate 110; and/or be generally resistant to corrosion from materials of electrolyte medium 190. For example, the electrically conductive material may be fabricated from a transparent conductive oxide (TCO), such as fluorine doped tin oxide (FTO), indium doped tin oxide (ITO), doped zinc oxide, indium zinc oxide, graphene, carbon nano fibers, silver nano wire or particles, conducting polymers, or other materials known in the art. However, in some embodiments, such as those where electroactive devices 100 is a battery or a capacitor, first electrode 130 may be substantially opaque or translucent.

Similarly, second electrode 140 is an electrically conductive material and comprises a seventh 147 and an eighth surface 148. Further, eighth surface 148 may be associated with third surface 123. Thus, eighth surface 148 may be disposed on third surface 123. The electrically conductive material may be fabricated from the same or similar materials as first electrode 130. Therefore, in some embodiments, second electrode 140 may be substantially transparent in the visible and/or infrared regions. In other embodiments, substantial transparency is not necessary, and second electrode 140 may be substantially translucent or opaque. Additionally, in some embodiments where electroactive device 100 is a mirror, second electrode 140 may be substantially reflective. Accordingly, second electrode 140 may comprise a reflective and/or conductive coating. Typical coatings for this type of reflector include chromium, rhodium, ruthenium, silver, and combinations thereof.

Cathodic film 150 is an electroactive film associated with sixth surface 136. Thus, cathodic film 150 may be disposed on sixth surface 136. Regardless of its ordinary meaning, "electroactive" may mean a component that undergoes a modification of its oxidation state upon exposure to a particular electrical potential difference. Cathodic film 150 may comprise a first polymeric matrix comprising one or more cathodic component immobilized thereon. One or more of the cathodic components may be electroactive. As used herein, immobilized may mean restricted from freely diffusing across chamber 180. Additionally, cathodic film 150 may comprise one or more cathodic buffer component. The cathodic buffer component may be any suitable component capable of reducing the formation of a residual reduced cathodic component. For example, a cathodic buffer component may be a material having a reduction potential that is less negative than the cathodic component's reduction potential. Each of these reduction potentials may be first reduction potentials in the sense that they are the potentials to achieve the first reductive states. Accordingly, the cathodic buffer may be individually selected based on the oxidation—reduction potential of a cathodic component.

Further, the cathodic components and the cathodic buffer components may each be immobilized in association with the first polymeric matrix. In some embodiments, the cathodic buffer components and the cathodic components may each be immobilized via incorporation into the first polymeric matrix via either a backbone approach or a pendant approach.

In accordance with the backbone approach, the cathodic component and/or the cathodic buffer component may be incorporated into the first polymeric matrix such that the cathodic component and/or the cathodic buffer component are covalently bonded into the first polymeric matrix backbone. For example, the cathodic components and/or the cathodic buffer components may be disposed at one or more locations between monomer units of the backbone of a polymer chain of the first polymeric matrix.

In accordance with the pendant approach, the cathodic components and/or the cathodic buffer components each may be covalently bonded to the first polymeric matrix backbone directly or incorporated into and/or bonded to a second polymeric matrix at one or more locations. The second polymeric matrix is bonded to the first polymeric matrix at one or more locations. In some embodiments, the second polymeric matrix may be a multitude of separate polymer chains where each chain is individually bonded to the first polymeric matrix. In other embodiments, the second polymeric matrix may be an interpenetrating matrix with the first polymeric matrix. As used herein, an interpenetrating matrix is a polymeric matrix that is not covalently bound to another polymeric matrix but immobilized with respect to the other polymeric matrix by way of a full or partial interlacing of the two matrices.

The cathodic components may be covalently bonded to the first and/or second polymeric matrices by functionalization of the cathodic components. Additionally, the first and second polymeric matrices may be the same or different.

In some embodiments, one or more of the cathodic components may also be electrochromic. Regardless of its ordinary meaning, the term "electrochromic" may mean a component that exhibits a change in its extinction coefficient at one or more wavelengths in the electromagnetic spectrum upon exposure to a particular electrical potential. Accordingly, upon application of a particular electric voltage or potential, a cathodic component may be activated, producing a change in absorbance at one or more wavelengths of the electromagnetic spectrum, preferably within the visible range. In other words, the cathodic component may change color and/or transmissivity when an electrical potential is applied.

In some embodiments, the cathodic buffer components may be substantially non-electrochromic in the visible region. Additionally, the cathodic buffer components may be substantially non-electrochromic across their entire electromagnetic spectrum. Alternatively, in other embodiments, the cathodic buffer components may likewise be electrochromic. In some such embodiments, the cathodic buffer components may be electrochromic in the visible region.

Anodic film 160 is an electroactive film associated with seventh surface 147. Thus, anodic film 160 may be disposed on seventh surface 147. Anodic film 160 may comprise a third polymeric matrix comprising one or more anodic components. One or more of the anodic components may be electroactive. Additionally, anodic film 160 may comprise one or more anodic buffer components. The anodic buffer component may be any suitable component capable of reducing the formation of a residual oxidized anodic component. For example, an anodic buffer component may be a material having an oxidation potential that is less positive than the anodic component's oxidation potential. Each of these oxidation potentials may be first oxidation potentials in the sense that they are the potentials to achieve the first oxidative states. Accordingly, the anodic buffer may be individually selected based on the reduction-oxidation potential of an anodic component.

Further, the anodic components and the anodic buffer components each may be immobilized in association with the third polymeric matrix. In some embodiments, the anodic buffer components and the anodic components may each be immobilized via incorporation into the third polymeric matrix via either a backbone approach or a pendant approach.

In accordance with the backbone approach, the anodic components and/or the anodic buffer components may be incorporated into the third polymeric matrix such that the anodic component and/or the anodic buffer component are covalently bonded into the third polymeric matrix backbone. For example, the anodic components and/or the anodic buffer component may be disposed at one or more locations between monomer units of the backbone of a polymer chain of the third polymeric matrix.

In accordance with the pendant approach, the anodic component and/or the anodic buffer component each may be covalently bonded to the third polymeric matrix backbone directly or incorporated into and/or bonded to a fourth polymeric matrix at one or more locations. The fourth polymeric matrix is bonded to the third polymeric matrix. In some embodiments, the fourth polymeric matrix may be a multitude of separate polymer chains where each chain is individually bonded to the third polymeric matrix. In other embodiments, the fourth polymeric matrix may be an interpenetrating matrix with the third polymeric matrix.

The anodic components may be covalently bonded to the third and/or fourth polymeric matrices by functionalization of the anodic components. Additionally, the third and fourth polymeric matrices may be the same or different.

In some embodiments, one or more of the anodic components may also be electrochromic. Accordingly, upon application of a particular electric voltage or potential, an anodic component may be activated, producing a change in absorbance at one or more wavelengths of the electromagnetic spectrum, preferably within the visible range. In other words, the anodic components may change color and/or transmissivity when an electrical potential is applied.

In some embodiments, the anodic buffer components may be substantially non-electrochromic in the visible region. Additionally, the anodic buffer components may be substantially non-electrochromic across their entire electromagnetic spectrum. Alternatively, in other embodiments, the anodic buffer components may likewise be electrochromic. In some such embodiments, the anodic buffer components may be electrochromic in the visible region.

In some embodiments, the positions of cathodic film 150 and anodic film 160 may be interchanged. Accordingly, cathodic film 150 may alternatively be associated with seventh surface 147 and anodic film 160 may alternatively be associated with sixth surface 136.

In accordance with one aspect of the present disclosure, cathodic film 150 and/or anodic film 160 may be associated with the sixth 136 and seventh 147 surfaces, respectively, via deposition. For example, the polymer matrix may be dissolved in a solvent which incorporates the respective cathodic or anodic components. This solution may then be coated onto the sixth 136 or seventh 147 surface, followed by removal of the solvent. The resultant film may be hard or tacky to the touch. In some embodiments, the polymer matrices may be subsequently cross-linked for increased mechanical stability. For example, polymer matrix systems that could be used with the cathodic component and/or anodic component include: a substituted polyacrylate, polymethacrylate, polystyrene, polyurethane, polyether, polyester, polycarbonate, polysiloxane, polysilane, polyacrylonitrile, polymethacrylonitrile, polyamide, polyimide, polyvinylidene halide, co-polymer and/or combinations of any two or more thereof. Alternatively, the cathodic 150 and anodic 160 films may be prepared utilizing any suitable method for providing a film having the desired thickness and uniformity. For example, the cathodic 150 and anodic 160 films may be prepared using a Mayer or other rod coating process; a doctor blade draw-down process; applied using vapor deposition; or applied as a spray coating.

In accordance with another aspect of the present disclosure, the cathodic and/or anodic components may include at least one polymerizable functional group that can be reacted with the polymer or monomers that form the first, second, third, or fourth polymer matrices of the cathodic 150 and anodic 160 films, respectively. Alternatively, the cathodic component and/or the anodic component may be incorporated into a compound that includes one or more polymerizable functional group that is capable of reacting with the polymer or monomers of the first, second, third, or fourth polymeric matrices to form the respective cathodic 150 and anodic 160 films. In this manner, the anodic and/or cathodic component may be covalently bonded to the respective first, second, third, or fourth polymeric matrix by one or more linkages.

In accordance with one aspect of the present disclosure, the cathodic component and/or anodic component may include a hydroxyl group, such that the compound may be covalently bonded to a respective first, second, third, or fourth polymer matrix via a condensation reaction or react with an isocyanate functionality to form a polyurethane-based polymer matrix. Amines may also react with isocyanate functionalities to form urea and biuret linkages. Additionally, other polymeric matrix systems may be used that include the cathodic component and/or anodic component that can be formed using a multi-functional epoxy in combination with a curing agent like an amine, alcohol, or anhydride or through base or acid catalyzed homo- or co-polymerization. Examples of materials that may be used as the first, second, third, and/or fourth polymeric matrix for covalently bonding with the cathodic and anodic components, respectively, include: polymethacrylates, polyacrylates, polystyrenes, polyurethanes, polyethers, polyesters, polycarbonates, polysiloxanes, polysilanes, polyacrylonitriles, polymethacrylonitriles, polyamides, polyimides, polyvinylidene halides, and co-polymer and combinations thereof. Likewise, a cathodic and/or anodic buffer component may be immobilized on a respective cathodic 150 and/or anodic 160 film by covalently bonding the buffer component to the first, second, third, and/or fourth polymeric matrices, using the same or different crosslinking chemistry.

In some embodiments, a buffer component may have an oxidation-reduction potential that is less negative than at least one of the cathodic components and less positive than at least one of the anodic components such that a buffer component having the same chemical structure may be used for both the cathodic buffer component and the anodic buffer component, with the buffer component in different oxidation states based on whether the buffer component is acting as the cathodic buffer component or the anodic buffer component. Examples of buffer components include ferrocene, substituted ferrocene, ferrocenium salt, substituted ferrocenium salt, and combinations thereof.

In some embodiments, cathodic film 150 may also comprise one or more anodic buffer component. The one or more anodic buffer component may be incorporated into cathodic film 150 in the same manner as the cathodic buffer component. Likewise, in some embodiments, anodic film 160 may also comprise one or more cathodic buffer component. The one or more cathodic buffer component may be incorporated into anodic film 160 in the same manner as the anodic buffer component.

Seal 170 may be disposed in a peripheral manner to, at least in part, define a chamber 180. Chamber 180 is disposed between first substrate 110 and second substrate 120. Accordingly, chamber 180 may be defined by seal 170 in conjunction with at least two of: first substrate 110, second substrate 120, first electrode 130, second electrode 140, cathodic film 150, and anodic film 160. In some embodiments, seal 170 may bridge across and extend about peripheries of the first and second substrates 110, 120. In other embodiments, seal 170, may be disposed between the first and second substrates 110, 120 in a peripheral manner. In some such embodiments, seal 170 may extend all the way to the second and/or third surfaces 112, 123. In such an embodiment, first electrode 130 and cathodic film 150 and/or second electrode 140 and anodic film 160 may be partially removed where seal 170 is positioned. Alternatively, seal 170 my terminate at and/or extend between cathodic film 150 and/or anodic film 160.

Seal 170 may comprise any material capable of being bonded to the at least two of: first substrate 110, second substrate 120, first electrode 130, second electrode 140, cathodic film 150, and anodic film 160, to in turn inhibit oxygen and/or moisture from entering chamber 170, as well as inhibit electrolyte medium 190 from inadvertently leaking out. Seal 170, for example, may include epoxies, urethanes, cyanoacrylates, acrylics, polyimides, polyamides, polysulfides, phenoxy resin, polyolefins, and silicones.

Electrolyte medium 190 comprises an electrolyte species. The electrolyte species may be in the form of a solvent and a salt. The salt may be a metal salt or an ammonium salt. Examples of suitable solvents for use in the electrolyte include: 3-methylsulfolane, dimethyl sulfoxide, dimethyl formamide, tetraglyme, and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; propylene carbonate (PC), ethylene carbonate; and homogenous mixtures thereof. Examples of suitable salts include: metal or ammonium salts, such as $Li^+$, $Na^+$, $K^+$, $NR_4^+$ (where each R is individually H, alkyl, or cycloalkyl), of the following anions $F^-$, $Cl^-$, $Br^-$, $I^-$, $BF_4^-$, $PF_6^-$, $SbF_6^-$, $AsF_6^-$, $ClO_4^-$, $CF_3SO_3^-$, $N(CF_3SO_2)_2^-$, $C(CF_3SO_2)_3^-$, $N(C_2F_5SO_2)_2^-$, $Al(OC(CF_3)_3)_4^-$, or $BAr_4^-$, where Ar is an aryl or fluorinated aryl group such as, but not limited to, $C_6H_5$, $3,5\text{-}(CF_3)_2C_6H_3$, or $C_6F_5$. Additionally, electrolyte medium 190 may comprise other materials, such as light stabilizers, thermal stabilizers, and antioxidants. Further, electrolyte medium 190 is disposed in chamber 180. In some embodiments, electrolyte medium 190 may comprise a polymeric or gel electrolyte. The polymeric electrolyte may be poly(styrene-ran-ethylene), polystyrene-block-poly(ethylene-ran-butylene), polystyrene-block-poly(ethylene/butylene)-block-polystyrene, poly(ethylene glycol), poly(methyl methacrylate), poly(2-hydroxyethylmethacrylate-ran-methylacrylate), polyurethane or other polymer electrolytes and/or combinations thereof. Additionally, electrolyte medium 190 may include a plasticizer that will help facilitate ion conductivity. Further, electrolyte medium 190 may partially permeate the cathodic 150 and/or anodic 160 films.

In operation, a certain electrical potential may be applied across first electrode 130 and second electrode 140. Accordingly, the electroactive cathodic 150 and anodic 160 films may undergo a modification of their oxidation states (i.e. become activated). Therefore, the cathodic and anodic components may be reduced and oxidized, respectively. Further, where at least one of the cathodic and anodic components are electrochromic, the respective species may undergo a color change. As such, electroactive device 100 may change transmittance from a first state to a second state.

Some embodiments of electroactive device 100 may have the advantage of cathodic components, anodic components, cathodic buffer components, and/or anodic buffer components immobilized in films. In a device without immobilization, the cathodic components, anodic components, cathodic buffer components, and/or anodic buffer components are free in solution. Accordingly, when an electrical potential is applied across first 130 and second 140 electrodes, cathodic components are reduced at an electrode and anodic components are oxidized at another. However, the reduced cathodic components and the oxidized anodic components may collide in solution and annihilate one another such that they are returned to their unreduced and unoxidized states, respectively. To compensate for this annihilation, an electrical potential is continuously applied in order to maintain cathodic and anodic component activation rates equal to or greater than the rate of annihilation. Further, such a system is self-erasing in that the cathodic and anodic components will automatically return to un-activated states when the electrical potential is removed. Therefore, when one or more of the cathodic components and/or anodic components are electrochromic, the change in extinction coefficient is reversed when the electrical potential is removed.

In a device where the cathodic and anodic components are immobilized, the device is generally not self-erasing. When an electrical potential is applied across the first and second electrodes 130, 140, cathodic components are reduced at one electrode and anodic components are oxidized at another. However, because these cathodic and anodic components are immobilized, they are no longer free to encounter one another in solution and annihilate one another. Additionally, anionic and cationic components of the electrolyte species may separate and diffuse across chamber 180 to balance the electrical charge build ups. Accordingly, the system is substantially no longer self-erasing and will remain in an activated state and any change in extinction coefficient will substantially remain.

However, when such systems are de-activated, some residual activation of the cathodic and anodic components may remain. When an external stress is applied such as by various impurities, oxygen, and/or sunlight to one or more of the cathodic and anodic components, the number of each component in an activated or un-activated state may change. Problematically, redox reactions generally must be balanced such that every electron that is removed through oxidation of an anodic species must be balanced by one electron that is accepted through reduction of a cathodic species. Therefore, the external stress induced imbalance between the number of activated cathodic components and anodic components means that residual activated components will remain, since a one to one relationship is generally required for the redox reaction. Accordingly, if the residual activated component is electrochromic, an undesirable residual color may appear in the device's inactive state.

In order to combat the formation of residual color, cathodic and/or anodic buffer components may be added in solution such that these components absorb the external stress, instead of their respective cathodic and/or anodic counterparts, as a result of each being more easily reduced or oxidized than their counterparts. Alternatively, if the external stress does activate one or more anodic and/or cathodic component, the buffer, may react with the anodic and/or cathodic component to de-activate them. This reaction is enabled by the buffer being more easily oxidized or reduced.

However, the introduction of these buffers in solution has the disadvantage in that they may increase the current required to maintain a level of activation. For example, buffers may create a current by: first, undergoing a redox reaction with a cathodic component; second, diffusing across the chamber; and third, undergoing a subsequent redox reaction with an anodic component. This process may cause de-activation. Likewise, the reverse may occur. As a result, an increased rate of deactivation may occur. Therefore, to compensate for such an interaction, the current applied by the first and second electrodes 130, 140 may be increased, relative what would otherwise be needed, to compensate for the rate of deactivation of the cathodic and anodic components caused by the buffer.

Problematically, prior implementations of the buffers shuttled electrons between the cathodic and anodic species, causing de-activation. Accordingly, the implementation of the buffer reduced or eliminated the benefits of the memory chemistry. In some instances, a current was required to maintain the desired level of activation in a steady state. However, electroactive device 100 has the advantage of cathodic and/or anodic buffer components immobilized on cathodic film 150 and/or anodic film 160. Accordingly, the need of a current to maintain electroactive device 100 in an activated state may be substantially reduced or eliminated.

Further, in embodiments where one or more of cathodic component, anodic component, cathodic buffer component, and anodic buffer component are immobilized on cathodic film 150 and/or anodic film 160 via a pendant approach, electroactive device 100 may have the advantage of enhanced electron transfer enabled by controlled movement of the species. The pendant approach may yield a component that is tethered to the first/third polymer matrix via the second/fourth polymer matrix, respectively. Accordingly, the component is immobilized in regard to its ability to diffuse away from its respective film but has some flexibility to move within the reach of its tether and transfer electrons to or between one or more respective cathodic or anodic component.

Figure 2:
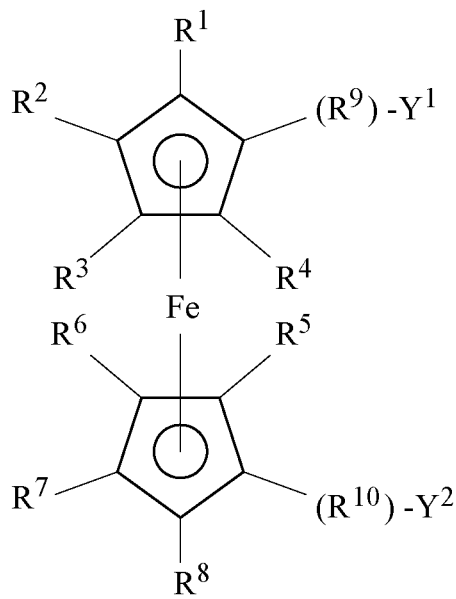
FIG. 2: Exemplary anodic and cathodic buffer components.
Figure 2:
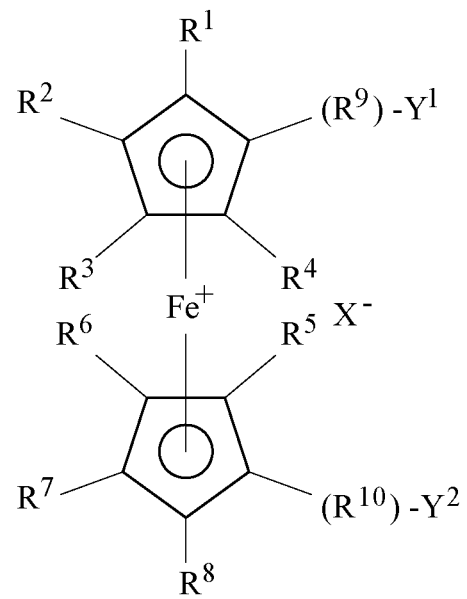

FIG. 2 depicts an exemplary anodic buffer component ("Structure (IA)") and an exemplary cathodic buffer component ("Structure (IB)"), respectively. Structures (IA) and (IB) have the same chemical structure but differ in their oxidation state. Structure (TB) is the oxidized, cationic species of Structure (IA). In some examples, the version of the Structure (IA) used as the anodic buffer component can be the same as the version of the Structure (IB) used as the cathodic buffer component in electroactive device 100. In other examples, different versions of the Structure (IA) and (IB) can be used in the same electroactive element 100 as the respective anodic buffer component and cathodic buffer component.

Referring to the structures, each $R^1$-$R^8$ are individually a hydrogen or an alkyl. As used herein, the term alkyl includes straight chain alkyl groups, branched alkyl groups, and cycloalkyl groups having from 1 to 10 carbons, from 1 to 5 carbons, or from 1 to 3 carbons. The alkyl groups can be substituted or unsubstituted. Substituted alkyl groups can be substituted one or more times with an amino group, a thio group, a hydroxy group, a cyano group, an alkoxy group, and/or a halogen group. Non-limiting examples of straight chain alkyl groups include methyl groups, ethyl groups, n-propyl groups, n-butyl groups, n-pentyl groups, n-hexyl groups, n-heptyl groups, and n-octyl groups. Non-limiting examples of branched alkyl groups include isopropyl, sec-butyl, t-butyl, isobutyl, neopentyl, and isopentyl. Additionally, a bridging alkyl group may be bound to both rings via two or more of $R^1$-$R^8$.

$R_9$ and $R_{10}$ are individually a functionalized alkyl group having from 1 to 20 carbons. The alkyl group can be a straight chain alkyl group, a branched alkyl group, or a cycloalkyl group having from 1 to 20 carbons, from 1 to 15 carbons, from 1 to 10 carbons, from 1 to 5 carbons, from 5 to 20 carbons, from 5 to 15 carbons, from 5 to 10 carbons, from 10 to 20 carbons, from 10 to 15 carbons, or from 15 carbons to 20 carbons. The alkyl groups can be substituted or unsubstituted. Substituted alkyl groups can be substituted one or more times with an amino group, a thio group, an hydroxy group, a cyano group, an alkoxy group, and/or a halogen group. Non-limiting examples straight chain alkyl groups include methyl groups, ethyl groups, n-propyl groups, n-butyl groups, n-pentyl groups, n-hexyl groups, n-heptyl groups, and n-octyl groups. Non-limiting examples of branched alkyl groups include isopropyl, sec-butyl, t-butyl, isobutyl, neopentyl, and isopentyl. Each of the $R^9$ and $R^{10}$ groups may be the same or different.

Each of the $R^9$ and $R_{10}$ groups may include a polymerizable functional group $Y^1$ and $Y^2$, respectively, configured to covalently bond the component to a polymeric matrix. Accordingly, in an immobilized state, the buffer component may be covalently bonded to the polymer matrix via functional group $Y^1$ and/or $Y^2$. Thus, $Y^1$ and $Y^2$ may each be an OH, $NH_3$, or $Si(OH)_3$ group or any polymerizable group capable of covalently bonding to a polymeric matrix. Examples of suitable polymerizable functional groups include a vinyl group, an acrylate group, a methacrylate group, a vinyl ether group, a hydroxyl group, an isocyanate group, an oxetane group, an amine group, and an epoxy group. The polymerizable functional groups $Y^1$ and $Y^2$ may be the same or different. In some examples, only one of the groups $R^9$ and $R^{10}$ may include a polymerizable functional group. Accordingly, in such an embodiment, $Y^1$ or $Y^2$ may be absent.

Each of the $R^1$-$R^8$ groups may be the same, different, or symmetric relative to the iron atom and the $R^9$ and $R^{10}$ groups may be the same or different than one another. In some examples, $R^1$ may be the same as $R^8$, $R^2$ may be the same as $R^7$, $R^3$ may be the same as $R^6$, $R^4$ may be the same as $R^5$, such that the two rings are mirror images of one another with respect to these groups. In some examples, the $R^9$ and $R^{10}$ groups are the same such that the bonding linkages are the same.

For Structure (TB), the anion $X^-$ may be any suitable counterion for Structure (TB), examples of which include a halide, a borate, a fluoroborate, a tetraaryl borate, a hexafluoro metal or metalloid, a sulfate, a sulfonate, a sulfonamide, a carboxylate, and a perchlorate. Additional non-limiting examples of suitable anions $X^-$ include: $F^-$, $Cl^-$, $Br^-$, $I^-$, $BF_4^-$, $PF_6^-$, $SbF_6^-$, $AsF_6^-$, $ClO_4^-$, $CF_3SO_3^-$, $N(CN)_2^-$, $N(CF_3SO_2)_2^-$, $C(CF_3SO_2)_3^-$, $N(C_2F_5SO_2)_2^-$, $Al(OC(CF_3)_3)_4^-$ or $BAr_4^-$, wherein Ar is a aryl or fluorinated aryl group. In one aspect, $X^-$ is $BAr_4^-$ and Ar is a pentafluorophenyl group or 3,5-bis(trifluoromethyl)phenyl.

Figure 3A:
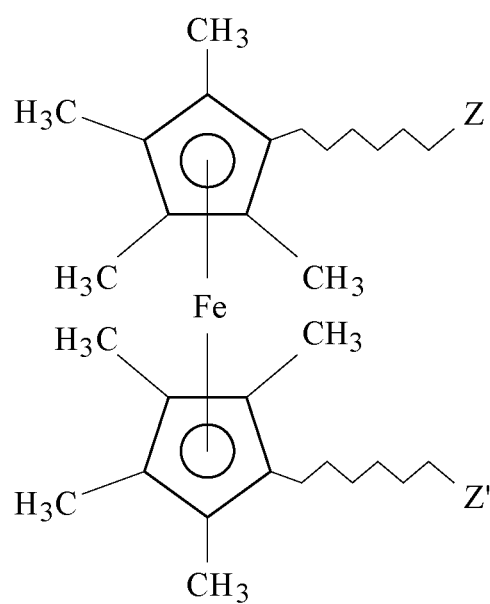
FIG. 3A: Exemplary anodic buffer components.
Figure 3B:
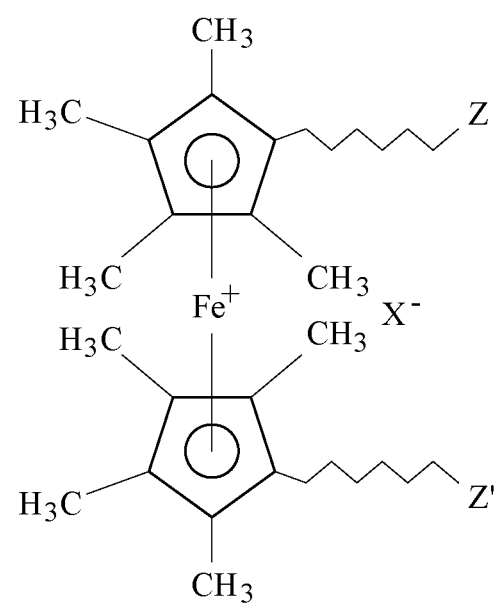
FIG. 3B: Exemplary cathodic buffer components.

FIGS. 3A and 3B illustrate exemplary anodic and cathodic buffer components, respectively. In these structures, Z and Z' may each be an OH or any polymerizable or cross-linkable group capable of covalently bonding the buffer to a polymer matrix. Accordingly, Z and Z' may each be any crosslinking group crosslinking the buffer component to a polymer matrix via a covalent bond. Further, Z and Z' may be the same or different. The anodic and cathodic buffers, may be synthesized as outlined below in the context of an octa-methyl di-hexanol ferrocene buffer component, but the synthesis process can be modified to provide other types of buffer components. Additionally, the octa-methyl di-hexanol ferrocene buffer may be synthesized using additional or alternative steps.

An exemplary octa-methyl di-hexanol ferrocene buffer was prepared as follows. Octa-methyl ferrocene can be purchased or made from tetramethyl cyclopentadiene and $FeCl_2$. Iron(II) chloride is made in situ from iron(0) and iron(III)chloride. The tetramethyl cyclopentadiene is deprotonated with n-butyl lithium and combined with iron(II) chloride to provide octa-methyl ferrocene. The octa-methyl ferrocene undergoes a Friedel-Crafts acylation with methyl adipic anhydride using zinc chloride as the catalyst and toluene as the solvent. 30 g of octa-methyl ferrocene was dissolved in 300 ml of toluene and to this solution 120 g of methyl adipic anhydride was added. After stirring for ½ hour, 54.4 g of zinc chloride was added to the solution and this was heated to a mild reflux, under a nitrogen atmosphere, for at least 4 hours. After 4 hours or more of reflux, 60 g of methyl adipic anhydride was added to the reaction mixture and after ½ hour another 27.2 g of zinc chloride was added. This was heated to a gentle reflux under a nitrogen atmosphere and held at that temperature for at least another 4 hours. The reaction was cooled to <50° C. and 300 ml of 0.2 N hydrochloric acid was added to wash out the zinc chloride. This was stirred and heated to 50-60° C. and transferred to a separatory funnel. The bottom acid wash layer was cut and discarded, and the top organic layer was added back to the reaction vessel. To the organic reaction solution was added another 300 ml of 0.2 N hydrochloric acid. This was stirred and heated to 50-60° C. Thereafter, it was transferred to a separatory funnel and the bottom acid wash was cut and discarded. The organic solution was added to the reaction flask with 300 ml of water, stirred, and heated to 50-60° C. This was transferred to a separatory funnel and the water layer was cut and discarded. The remaining toluene layer was stripped to dryness under vacuum and 300 ml of toluene was added to dissolve the remaining oil. The toluene solution was added to the reaction flask and then 30 g of methyl adipic anhydride was added and ½ hour later, 13.6 g of zinc chloride was added. These were heated to a gentle reflux for at least 4 hours. The reaction mixture was cooled to <50° C. and to it was added 300 ml of 0.2 N hydrochloric acid. The mixture was stirred, heated to 50-60° C., and transferred to a separatory funnel. The bottom acid wash was cut and discarded.

The remaining organic layer was charged back to the reaction vessel and 24.8 g of sodium carbonate mono hydrate and 300 ml of water were added to it. This mixture was stirred and heated to a gentle reflux under a nitrogen atmosphere to remove remaining anhydride. The mixture was transferred to a separatory funnel and the base layer was cut and discarded. The organic layer was concentrated to 48.2 g of a red oil that was mostly octa-methyl di-methyl adipoyl ferrocene.

To the red oil was added 300 ml of dry tetrahydrofuran and 320 ml of 1.0 Molar $BH_3$/THF. This solution was stirred at room temperature for at least 24 hours to reduce the carbonyl and ester groups to an alkyl alcohol group. The reduction was quenched with slow addition of methanol until out-gassing stops. Then 100 ml of toluene and 200 ml of 2 N sodium hydroxide was added. The reaction mixture was stirred and heated to 70-80° C. and transferred to a separatory funnel. The base layer was cut and discarded and to the organic layer was added 100 ml of water. The mixture was shaken vigorously and the water layer was cut and discarded. The organic layer was vacuum distilled to remove solvents. 300 ml of toluene was added and distilled off under vacuum to dry the remaining 35.3 g of brown oil. The desired octa-methyl di-hexanol ferrocene anodic buffer of FIG. 3A was present at 80.5% by HPLC with 7.2% of the mono-hexanol impurity and 6.4% of a mono-hexanol mono-methyl hexanoate intermediate.

An exemplary method of forming the octa-methyl di-hexanol ferrocenium cathodic buffer of FIG. 3B includes converting the octa methyl di-hexanol ferrocene anodic buffer of FIG. 3A. The conversion of the octa methyl di-hexanol ferrocene anodic buffer may include the addition of 1.0 equivalent of $AgBF_4$ to 1.0 equivalent of the ferrocene in acetonitrile solution. The mixture was stirred at 75° C. for 4 hours and then cooled to room temperature. The resulting silver metal by-product was gravity filtered from the solution. The solution was then concentrated under vacuum leaving a dark green oil which was predominately the octa-methyl di-hexanol ferrocenium $BF_4^-$ cathodic buffer.

Figure 4A:
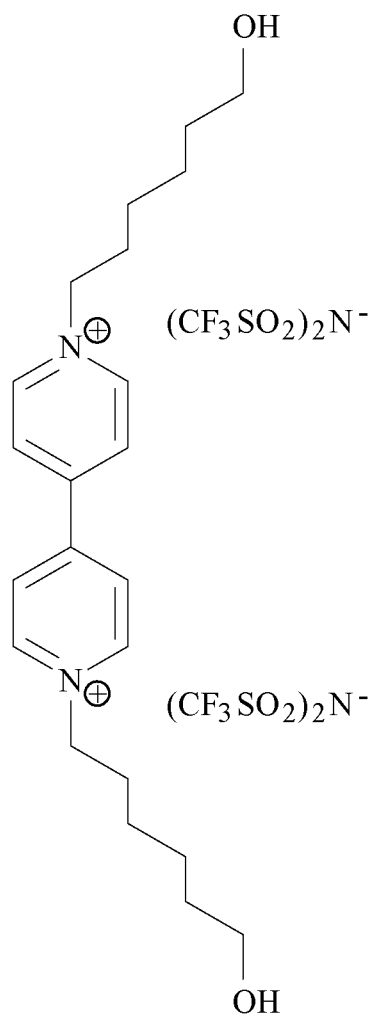
FIG. 4A: Exemplary cathodic component having polymerizable hydroxyl functional groups for forming a cathodic film.

FIG. 4A illustrates an example of a cathodic component having polymerizable hydroxyl functional groups for forming a cathodic film that may be associated with any suitable cathodic buffer component. A cathodic film was prepared by combining the cathodic component of FIG. 4A, an isocyanate, a solvent, and a catalyst. The cathodic component of FIG. 4A is a viologen-based material including two C6 alkyl groups each with an alcohol polymerizable functional groups which react with the isocyanate to form a cross-linked film. The film was deposited on an ITO-coated glass substrates using a Mayer rod method. The deposited cathodic film was cured overnight at 60° C. under nitrogen until crosslinked.

Figure 4B:
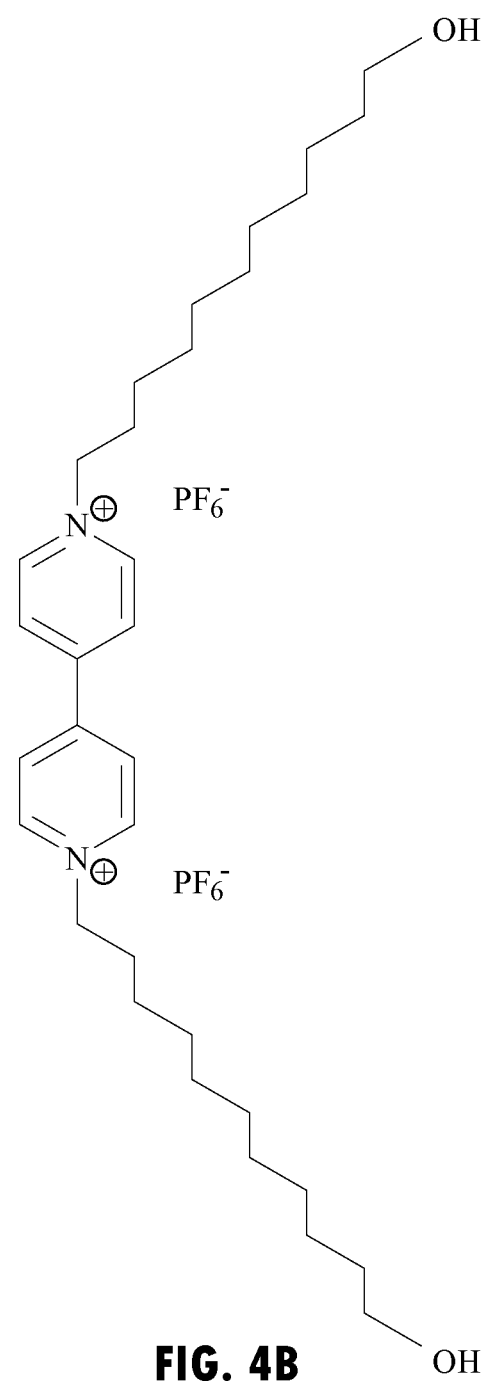
FIG. 4B: Exemplary cathodic component having polymerizable hydroxyl functional groups for forming a cathodic film.

FIG. 4B illustrates an example of a cathodic component having polymerizable hydroxyl functional groups for forming a cathodic film that may be used within any suitable cathodic buffer component. The cathodic component may be used for forming a cathodic film. The cathodic component is a viologen-based material having two C11 alkyl groups each with an alcohol polymerizable function groups which react with the isocyanate to form a cross-linked film. The film was deposited on an ITO-coated glass substrate using the Mayer rod method. The deposited cathodic film was cured overnight at 60° C. under a nitrogen atmosphere until crosslinked.

Figure 5A:
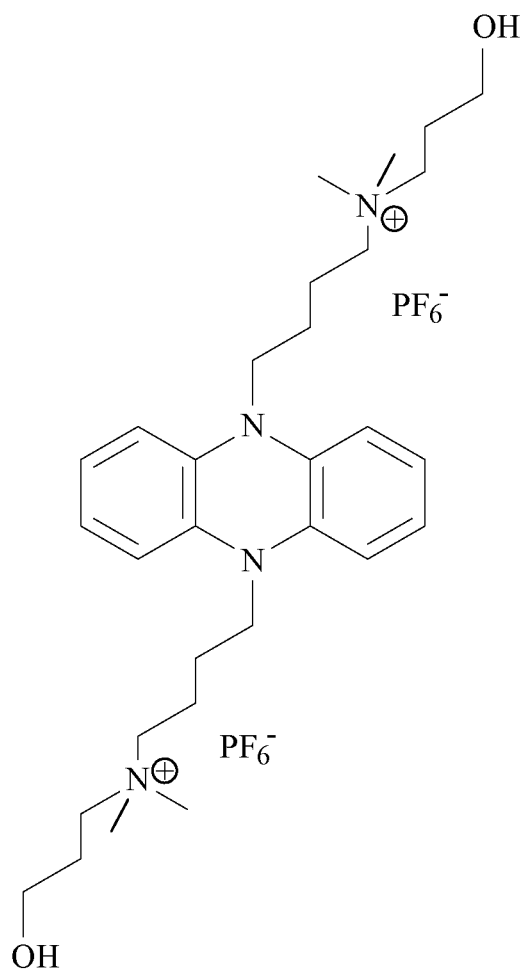
FIG. 5A: Exemplary anodic component having polymerizable hydroxyl functional groups for forming an anodic film.

FIG. 5A illustrates an example of an anodic component having polymerizable hydroxyl functional groups for forming an anodic film that can be used with any suitable anodic buffer component. An exemplary anodic film was prepared by combining the anodic component, an isocyanate, a solvent, and a catalyst. The anodic component is a phenazine-based material that includes two polymerizable hydroxyl functional groups, which react with the isocyanate to form a cross-linked film. The film was deposited on an ITO-coated glass substrate using the Mayer rod method. The deposited anodic film was cured overnight at 60° C. under nitrogen until crosslinked.

Figure 5B:
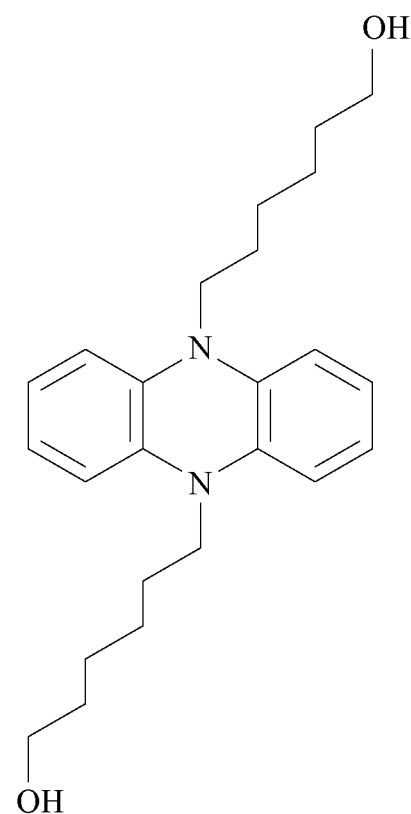
FIG. 5B: Exemplary anodic component having polymerizable hydroxyl functional groups for forming an anodic film.

FIG. 5B illustrates an example of an anodic component having polymerizable hydroxyl functional groups for forming an anodic film that can be used with any suitable anodic buffer component. The anodic film was prepared by combining the anodic component, an isocyanate, a solvent, and a catalyst. The anodic component is a phenazine-based material that includes two C6 alkyl alcohol polymerizable functional groups which react with the isocyanate to form a cross-linked film. The film was deposited on an ITO-coated glass substrate using the Mayer rod method. The deposited anodic film was cured overnight at 60° C. under nitrogen until crosslinked.

Examples for Immobilized Buffer Component Film Preparation

Certain aspects of the present disclosure are illustrated in more detail in the following examples. Specifically, below are exemplary preparations of cathodic 150 and anodic 160 films with a buffer component immobilized thereon. Unless otherwise specified, all concentrations are at room temperature (20-27 degrees Celsius). Further, HDT (hexamethylene diisocyanate trimer, biuret version; Sigma), DBTDA (dibutyltin diacetate; Sigma), surfactant, and solvent were purchased and used without further purification, unless otherwise specified. Additionally, the cathodic and anodic components may be made by methods described in this patent or by other methods known in the art.

An exemplary cathodic film 150 was prepared as follows. In a 20 mL vial the following were combined: 1,1'-dihexanol-4,4'-dipyridinium bis(bis(trifluomethanesulfonimide)) (0.591 g, 1.29 mmol OH), 1,1'-diundecanol-4,4'-dipyridinium bis(hexafluorophosphate) (0.507 g, 1.29 mmol OH), 1,1'-dihexanol-2,2',3,3',4,4',5,5'-octamethylferrocenium tetrafluoroborate (0.050 g, 0.17 mmol OH), HDT (0.452 g, 2.50 mmol NCO), solvent (8.40 g), and surfactant (0.002 g) along with a stir bar. The vial was capped with argon to minimize moisture exposure, sealed, and then stirred approximately 20 minutes at room temperature until dissolved. In a separate vial, a catalyst solution was prepared by dissolving 0.060 g DBTDA in 9.940 g solvent and shaken to dissolve. A cleaned and dried ITO (indium tin oxide) coated glass sheet was placed onto a draw-down coater fitted with a #16 Mayer rod. Then shortly before coating, 69.4 uL (50 ppm Sn) of the DBTDA solution was transferred to the reaction vial using a micropipet. The resulting solution was then capped and shaken to mix the solutions. Approximately 2 mL of reaction solution was removed via a disposable pipet and dispensed in a uniform line across the width of the glass substrate near the coating rod. The coater was started and the rod moved over the substrate forming a uniform coating. After which, the substrate and coating were transferred to an oven which had been preheated to 60° C. and purged with nitrogen. The substrate was placed in a flat position in the oven overnight to cure with a continuous nitrogen flow.

An exemplary anodic film 160 was prepared as follows. In a 20 mL vial the following were combined: 4,4'-(phenazine-5,10-diyl)bis(N-(3-hydroxypropyl)-N,N-dimethylbutan-1-aminium) bis(hexaflurophosphate) (1.512 g, 3.84 mmol OH), 1,1'-dihexanol-2,2',3,3',4,4',5,5'-octamethylferrocene (0.064 g, 0.26 mmol OH), HDT (0.674 g, 3.72 mmol NCO), solvent (7.75 g), and surfactant (0.005 g) along with a stir bar. The vial was capped with argon to minimize moisture exposure, sealed, and then stirred approximately 20 minutes at room temperature until dissolved. In a separate vial, a catalyst solution was prepared by dissolving 0.060 g DBTDA in 9.940 g solvent and shaken to dissolve. A cleaned and dried ITO (indium tin oxide) coated glass sheet was placed onto a draw-down coater fitted with a #8 Mayer rod. Then, shortly before coating, 69.4 uL (50 ppm Sn) of the DBTDA solution was transferred to the reaction vial using a micropipette. The resulting solution was then capped and shaken to mix the solutions. Approximately 2 mL of reaction solution was removed via a disposable pipet and dispensed in a uniform line across the width of the glass substrate near the coating rod. The coater was started, and the rod moved over the substrate forming a uniform coating. After which, the substrate and coating were transferred to an oven which had been preheated to 60° C. and purged with nitrogen. The substrate was placed in a flat position in the oven overnight to cure with a continuous nitrogen flow.

In this document, relational terms, such as "first," "second," "third," and the like, are used solely to distinguish one entity or action from another entity or action, without necessarily requiring or implying any actual such relationship or order between such entities or actions.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A device comprising:
   a first substrate comprising a first surface and a second surface;
   a second substrate comprising a third surface and a fourth surface, wherein the second substrate is disposed in a spaced apart relationship with the first substrate;
   a first electrode associated with the second surface;
   a second electrode associated with the third surface;
   a cathodic film associated with the first electrode, the cathodic film comprising a cathodic component immobilized thereon, the cathodic component having a first reduction potential;
   an anodic film associated with the second electrode, the anodic film comprising an anodic component immobilized thereon, the anodic component having a first oxidation potential; and
   at least one of:
      a cathodic buffer component comprised in the cathodic film, the cathodic buffer component having a first reduction potential, wherein the first reduction potential of the buffer component is less negative than the first reduction potential of the cathodic component, and
      an anodic buffer component comprised in the anodic film, the anodic buffer component having a first oxidation potential, wherein the first oxidation potential of the buffer component is less positive than the first oxidation potential of the anodic component;
   wherein at least one of the cathodic and anodic components is electrochromic.

2. The device of claim 1, further comprising both the cathodic buffer component and the anodic buffer component.

3. The device of claim 1, wherein:
   the cathodic film comprises a first polymeric matrix having a backbone comprising a plurality of monomer units; and
   the cathodic buffer component is disposed at one or more locations between monomer units of the backbone.

4. The device of claim 1, wherein:
   the cathodic film comprises a first polymeric matrix having a backbone; and
   the cathodic buffer component is covalently bonded to the backbone at one or more locations as a functional group.

5. The device of claim 1, wherein:
   the cathodic film comprises a first polymeric matrix and a second polymeric matrix, the second polymeric matrix cross-linked with the first polymeric matrix at one or more locations; and
   the cathodic buffer component is covalently bonded to the second polymeric matrix.

6. The device of claim 1, wherein:
   the cathodic film comprises a first polymeric matrix and a second polymeric matrix, the second polymeric matrix:
      cross-linked with the first polymeric matrix at one or more locations, and
      having a second backbone comprising a plurality of monomer units; and
   the cathodic buffer component is disposed at one or more locations between monomer units of the second backbone.

7. The device of claim 1, wherein:
   the anodic film comprises a first polymeric matrix having a backbone comprising a plurality of monomer units; and
   the anodic buffer component is disposed at one or more locations between monomer units of the backbone.

8. The device of claim 1 wherein:
   the anodic film comprises a first polymeric matrix having a backbone; and
   the anodic buffer component is covalently bonded to the backbone one or more locations as a functional group.

9. The device of claim 1, wherein:
   the anodic film comprises a first polymeric matrix and a second polymeric matrix, the second polymeric matrix cross-linked with the first polymeric matrix at one or more locations; and
   the anodic buffer component is covalently bonded to the second polymeric matrix.

10. The device of claim 1, wherein:
    the anodic film comprises a first polymeric matrix and a second polymeric matrix, the second polymeric matrix:
       cross-linked with the first polymeric matrix at one or more locations, and
       having a second backbone comprising a plurality of monomer units; and
    the anodic buffer component is disposed at one or more locations between monomer units of the second backbone.

11. The device of claim 1, wherein the cathodic buffer component is also comprised in the anodic film.

12. The device of claim 1, wherein the anodic buffer component is also comprised in the cathodic film.

13. The device of claim 1, wherein:
    at least one of:
       the anodic buffer component is of a first structure:

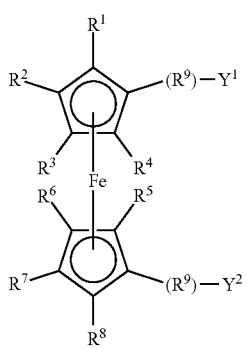

the cathodic buffer component is of a second structure:

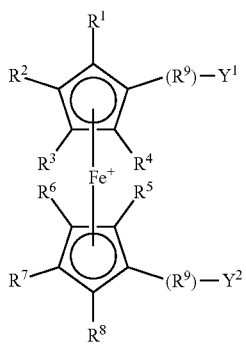

wherein:
  each of $R^1$-$R^8$ are individually a hydrogen or an alkyl, and
  each of $R^9$ and $R^{10}$ are individually an alkyl group having from 1 to 20 carbons and a functional group $Y^1$ or $Y^2$, respectively, wherein:
    for the anodic buffer component, at least one of $Y^1$ and $Y^2$ is covalently bonded to a first polymeric matrix of the cathodic film, and
    for the cathodic buffer component, at least one of $Y^1$ and $Y^2$ is covalently bonded to a second polymeric matrix of the anodic film.

14. A device comprising:
a first substrate comprising a first surface and a second surface;
a second substrate comprising a third surface and a fourth surface, wherein the second substrate is disposed in a spaced apart relationship with the first substrate;
a first electrode associated with the second surface;
a second electrode associated with the third surface;
a cathodic film associated with the first electrode;
an anodic film associated with the second electrode;
a cathodic component having a reduction potential, wherein the cathodic component is immobilized on the cathodic film;
an anodic component having an oxidation potential, wherein the anodic component is immobilized on the cathodic film; and
at least one of:
  a cathodic buffer having a reduction potential, wherein:
    the reduction potential of the cathodic buffer is less negative than the reduction potential of the cathodic component, and
    the cathodic buffer is immobilized on the cathodic film, and
  an anodic buffer having an oxidation potential, wherein:
    the oxidation potential of the anodic buffer is less positive than the oxidation potential of the anodic component, and
    the anodic buffer is immobilized on the anodic film.

15. The device of claim 14, wherein at least one of the cathodic and anodic components are electrochromic.

16. The device of claim 14, wherein:
the cathodic film comprises a first polymeric matrix; and
the cathodic buffer is associated with the first polymeric matrix via a backbone approach.

17. The device of claim 14, wherein:
the cathodic film comprises a first polymeric matrix; and
the cathodic buffer is associated with the first polymeric matrix via a pendant approach.

18. The device of claim 14, wherein:
the anodic film comprises a third polymeric matrix; and
the anodic buffer is associated with the third polymeric matrix via a backbone approach.

19. The device of claim 14, wherein:
the anodic film comprises a third polymeric matrix; and
the anodic buffer is associated with the third polymeric matrix via a pendant approach.

20. The device of claim 14:
comprising the cathodic buffer and the anodic buffer;
wherein each of the cathodic buffer and the anodic buffer are immobilized by at least one of a backbone approach and a pendant approach.

* * * * *